May 4, 1965 R. A. KEIR 3,182,180

DIVISION SYSTEM

Filed Nov. 17, 1960 4 Sheets-Sheet 1

Roy A. Keir

*INVENTOR.*

BY Byard G. Nilsson attorney

May 4, 1965 R. A. KEIR 3,182,180

DIVISION SYSTEM

Filed Nov. 17, 1960 4 Sheets-Sheet 2

Roy A. Keir
*INVENTOR.*

*BY* Byard G. Nilsson
attorney

Roy A. Keir
INVENTOR.

BY Byard G. Nilsson
attorney

May 4, 1965 R. A. KEIR 3,182,180

DIVISION SYSTEM

Filed Nov. 17, 1960 4 Sheets-Sheet 4

Roy A. Keir
INVENTOR.

BY Byard G. Nilsson
attorney 3,182,180
Patented May 4, 1965

3,182,180

DIVISION SYSTEM

Roy A. Keir, Los Angeles, Calif., assignor, by mesne assignments, to Control Data Corporation, Minneapolis, Minn., a corporation of Minnesota Filed Nov. 17, 1960, Ser. No. 70,053
9 Claims. (Cl. 235—164)

The present invention relates to a division system to form a numerical value representative of the quotient of other numerical values representing a numerator and a denominator.

It is well known, that the division of a numerator by a denominator can be accomplished by repeatedly subtracting the denominator from the numerator and tallying the number of subtractions which are accomplished. After a number of such subtractions (or possibly at the outset of the divisional process) the remainder (or the initial numerator) is less than the denominator. In order to proceed with the subtractive process from this point and obtain a fractional value in the quotient, it is customary to shift the digits of the numerator one order of significance and proceed to subtract, taking shift into consideration in the quotient.

In a machine, functioning to perform the above-described process, the indication that the denominator exceeds the numerator, or remainder, is not manifest until a substraction produces a negative remainder. The machine must then re-establish the values as they existed prior to the subtraction and shift the remainder an order of significance before proceeding with another subtraction. Therefore, a machine operating in this manner would perform many subtraction operations which would serve only to indicate that the remainder is smaller than the denominator.

In general, the subtractive operation by machine consumes a relatively large amount of time and a divider operating according to the above-described principles would normally have a relatively-long operating cycle. Therefore, various dividing systems have been proposed which employ fewer subtractive operations. In general shifting operations (to change the order of significance of digits) can be performed much faster than subtractions. Therefore, any instance of replacing a subtraction with a shift operation represents a definite improvement in application to automatic computers.

In general, the present invention comprises a digital divider system, for dividing numerical values represented by signals in a floating-point form. That is, the present system employs signals representing numbers with two components, i.e. a mantissa (representing a series of digits) and a characteristic (indicating the point in the digits).

In the operation of the system, the mantissa of both the numerator and the denominator are shifted to a normalized position, thereby defining limits for the first digit of the quotient mantissa. These shift operations are accounted for by altering the characteristic values. Next, the denominator is subtracted from the numerator and depending upon the relative size of these values, the system then proceeds to either perform subtractions, shifting operations, or additions to form the quotient digit by digit. These operations proceed in one of two alternate modes depending upon the numbers encountered.

An important aspect of the present invention is that the resultant value of each subtraction is actually used and the results of subtractions are never negated. Furthermore, the number of subtractions is relatively few. Therefore, the system attains a significant increase in operating speed.

An object of the present invention is to provide an improved system to divide digital values represented in floating-point form.

Another object of the present invention is to provide a digital, floating-point divider, which is capable of operating at a very-high speed and which may be economically manufactured.

These and other objects and advantages of the present invention will become apparent from a consideration of the following specification and appended drawings, wherein.

Preliminary to a detailed consideration of the system of the present invention, an exemplary division will be considered. Therefore, assume that it is desired to perform the following operation:

$$\frac{\text{numerator}}{\text{denominator}}=\frac{N}{D}=\frac{286}{13}=22=Q=\text{quotient}$$

The operation as described herein will be performed using binary notation; therefore, assuming that the characteristic values of the numbers are "one" to indicate the binary point at the extreme right, the values may be stated as:

$$\frac{N}{D}=\frac{100011110.}{000001101.}=000010110$$

The first basic operation in the division process is to normalize the denominator D. That is, the denominator D is shifted to the left until a one-digit appears in the most-significant digit position. After the normalizing operation is complete, the fraction representative of the quotient is:

$$\frac{N}{D}\frac{100011110.\times 2^{0}}{110100000.\times 2^{-5}}$$

Next the numerator is shifted to the left until a one-digit appears in the most-significant digit position. In the example selected, a one-digit already occupies the most-significant digit position; therefore, no further shifting is necessary. Of course, in the event that shifting is performed, it is accounted for by adjusting the characteristic of the numerator.

With the above fraction (representing the quotient) in a form with one-digits in the most-significant digit position of both mantissa values, certain limits for the quotient mantissa are established. That is, each of the mantissa values are known to be at least 256 (the value of the most-significant binary digit) but are also known to be less than 512. Therefore, the two extreme values which can possibly be represented by the fraction are:

$$\frac{256}{512-} \text{ and } \frac{512-}{256}$$

Therefore, the mantissa of the quotient Q must fall within the limits of one half and two, e.g. $\frac{1}{2}<Q>2$.

Figure 1:
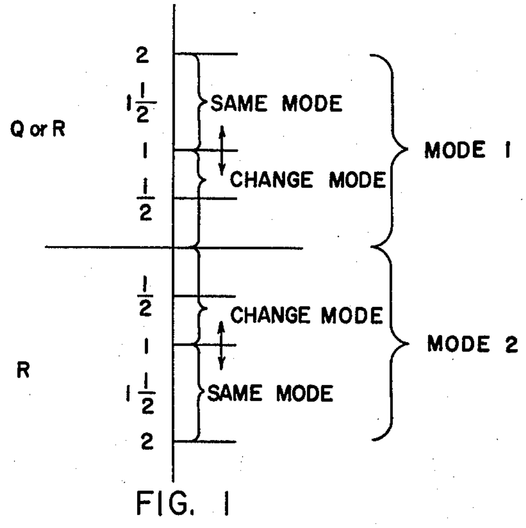
FIGURE 1 is a diagram illustrating the operation of the system of the present invention.

FIGURE 1 illustrates the development of the quotient mantissa which is known initially to be between the positive values of ½ and 2, as indicated graphically.

To develop the mantissa of the quotient digit-by-digit, the mantissa of the denominator is first subtracted from the mantissa of the numerator. If a positive remainder results from this subtraction, the quotient is known to be greater than one; however, if a negative remainder results, the quotient is known to be less than one. If a positive remainder results, a one is placed in the most-significant digit position of the quotient and the numerator is again shifted until a one-digit is again in the most-significant digit position. The situation is then identical to that previously considered and another subtraction is performed.

If, however, the result of the initial subtraction (or any other subtraction) is negative, it is established that the denominator (or remainder) was greater than the numerator; therefore, the system changes to a second mode (described below) and functions below the zero reference line indicated in FIGURE 1. In this instance, the performed subtraction is held valid, a zero is entered in the mantissa of the quotient under development, and the remainder is then added to the denominator. The second mode of operation is similar to the initial mode (above the zero reference line); however, in the second mode, the negative remainder is complemented and is therefore added rather than subtracted.

Operation in the second mode continues until the quotient Q is fully developed or an addition results in a negative number, whereupon the system returns to the initial mode of operation to continue the process.

Figure 2:
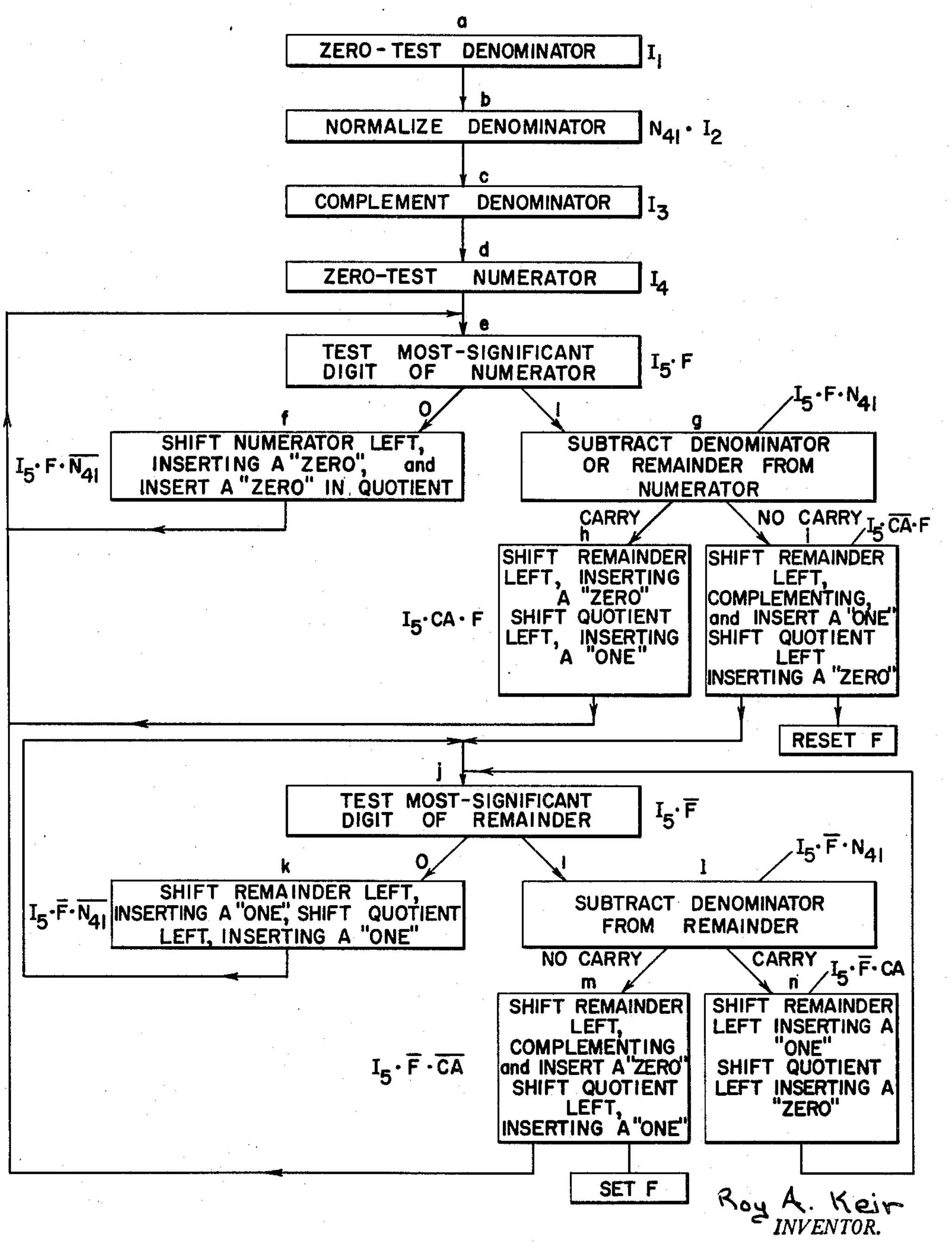
FIGURE 2 is a flow chart illustrating the divisional process of the present invention.

With the above preliminary considerations in mind, reference will now be had to FIGURE 2 which is a flow chart of the complete division operation, and after an initial consideration, the chart will be pursued in conjunction with the exemplary numbers.

The chart of FIGURE 2 reads from top to bottom and designates the steps of the division process by boxes which are alphabetically designated. The complex manipulations in the process are performed primarily upon the mantissa values. The preliminary or initial characteristic of the quotient is formed by subtracting the denominator characteristic from the numerator characteristic. Then "one" values are either added to, or subtracted from this preliminary characteristic to account for shifts in the mantissa values of the denominator and numerator as the operation proceeds.

The chart of FIGURE 2, therefore, serves only as a guide to the more complex operations performed on the mantissa values. In FIGURE 2, the first box "*a*" indicates a zero test for the denominator. If the denominator is zero then the quotient is infinity and cannot be obtained through the divisional process.

After the denominator has been established to be a numerical value, it is normalized (shifted left until a one is in the most-significant digit location) as indicated by the box "*b*." Next, the denominator is complemented, as indicated in the box "*c*," which places the denominator in a form to be subtracted from the numerator in accordance with the well-known technique of addition and complementation. It is to be noted that the denominator (complemented at the outset) remains complemented throughout the entire process.

Next, the numerator is tested to assure that it is not zero. This operation is indicated by the box "*d*" in FIGURE 2. If the numerator is zero, the quotient Q is known to be zero and further processing is not necessary.

Assuming the numerator is not zero, the next step in the operation is indicated by the box "*e*" and consists of testing the most-significant digit of the numerator. If the most-significant digit of the numerator is a zero, then the numerator is shifted to the left until a one appears. Zeros are then inserted in the quotient and the vacated digit positions of the numerator.

As indicated by the box "*g*," if, upon testing, the most-significant digit of the numerator it is found to be a one-digit, the denominator is subtracted from the numerator. Considering the above fractional value as a numerical example:

$$\frac{N}{D}=\frac{100011110}{110100000}$$

it may be seen that the initial shifting operations have been accomplished. That is, both the numerator and the denominator have one-digits in their most-significant digit position. Therefore, the next step is to subtract the denominator from the numerator.

As previously indicated, the denominator is complemented; therefore, the denominator may be subtracted from the numerator by adding the complement of the denominator to the numerator along with a "one" in the least-significant digit position, as follows:

$$\begin{array}{r} 1 \\ 100011110 \\ \underline{001011111} \\ 101111110 \end{array}$$

As indicated in FIGURE 2, at box "*g*," the process path now divides depending upon whether or not this addition results in a carry digit from the most-significant digit position. If a carry digit ("one") is produced, the remainder is shifted to the left, inserting a "zero" in the vacated digit position and a "one" as the most-significant digit of the quotient Q (as indicated in the box "*h*"). This situation exists when the denominator is smaller than the numerator, indicating that the mantissa of the quotient Q will be greater than "one." After the operations indicated in the box "*h*" are performed, the process returns to the box "*e*" to repeat this portion of the process.

Figure 3:
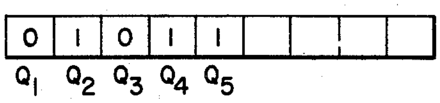
FIGURE 3 is a chart indicating the manner in which a quotient is developed in a system of the invention.

If the subtraction operation designated by the box "*g*" of FIGURE 2 does not produce a digit carry from the most-significant digit position (as in the example), the operation proceeds to the box "*i*," as indicated. Thereupon, the remainder is shifted to the left one digit position, complementing and inserting a "one" in the vacated digit position. Also, the quotient is shifted to the left inserting a "zero" which effectively means that the most-significant digit of the partial quotient is a "zero" as indicated in FIGURE 3, at Q1 which figure shows the individual digits of the quotient in the example.

Shifting the remainder of the example to the left one digit position, complementing and inserting a one-digit in the vacated position provides:

$$100000011$$

Thus, the system changes to the second mode, which is indicated by a two-state memory device, e.g. binary, designated F. The operation then proceeds as indicated in box "*j*" to determine whether the most-significant digit of the remainder is a "one" or a "zero." If the most-signficant digit of the remainder is a "zero," the operation proceeds to the box "*k*" indicating the remainder is to be shifted to the left inserting a "one" in both the vacated digit position of the remainder and as the next digit of the quotient. It is to be noted, that this operation is the inverse of the operation designated by the box "*f*" in the initial mode.

If the most-significant digit of the present remainder is a "one," the operation proceeds to the box "*l*" which commands that the denominator be subtracted from the remainder. In the present state both the remainder and the denominator are complemented. Therefore, subtracting the denominator by adding results in the following expression:

$$\begin{array}{r} 1 \\ 100000011 \\ +001011111 \\ \hline 101100011 \end{array}$$

Considering the chart of FIGURE 2, if a carry results from the above addition, the operation proceeds to the box "*n*" which provides that the remainder be shifted to the left insert a "one" while the quotient be shifted to the left inserting a "zero." Thereafter the process returns to the box "*j*." However, if no carry digit is produced, i.e. no "one" is carried from the most-significant digit position, then the operation proceeds to the box "*m*," which indicates that the remainder be shifted to the left, complementing and inserting a "zero." The quotient is also shifted to the left inserting a "one." Performing these latter operations upon the results of the numerical example produce the following remainder and partial quotient:

$$R=100111000 \qquad pQ=01$$

Then, the subtraction operation indicated in the box "*e*" is as follows:

$$\begin{array}{r} 1 \\ 100111000 \\ 001011111 \\ \hline 110011000 \end{array}$$

No carry digit is produced; therefore, a zero is placed in the quotient position Q3 and the remainder is again complemented and shifted to a form as follows:

$$R=011001111 \qquad pQ=010$$

Testing the most significant digit of the remainder (as indicated by box "*j*") indicates a "zero"; therefore, the operation proceeds to the box "*k*" which instructs that the remainder digits be shifted left, inserting a "one" in the digit position Q4 of the quotient, as follows:

$$R=110011111 \qquad pQ=0101$$

A second test of the most-significant digit indicates a "one"; therefore, operation proceeds to the box "*l*" and the denominator is added to the remainder as follows:

$$\begin{array}{r} 1 \\ 110011111 \\ +001011111 \\ \hline 111111111 \end{array}$$

Again, no carry digit is produced so the operation proceeds to the box "*m*" resulting in the following values for the remainder and partial quotient:

$$R=000000000 \qquad pQ=01011$$

The occurrence of all "zeros" in the remainder now indicates that the division is complete. It is to be noted, that completion is also indicated by the occurrence of a "one" in the most-significant digit position of the register containing the partial quotient.

Considering the partial quotient developed above, this value 01011 represents the mantissa of the true quotient Q. As indicated above, the characteristic of the true quotient is obtained by subtracting the characteristic of the denominator from the characteristic of the numerator and performing substractions of one from the resultant value with each shift of the numerator. The result of this process in the present example is two indicating that the binary point in the quotient above is located one place to the right of the least-significant one digit. Thus the true quotient of 000010110 (22) is obtained.

Figure 4:
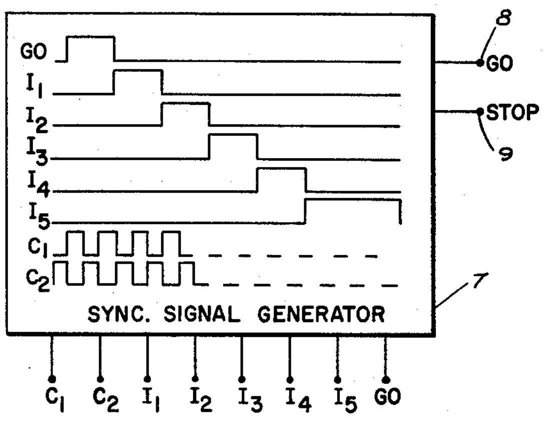
FIGURE 4 is a diagrammatic representation of part of a system constructed in accordance with the present invention.
Figure 5:
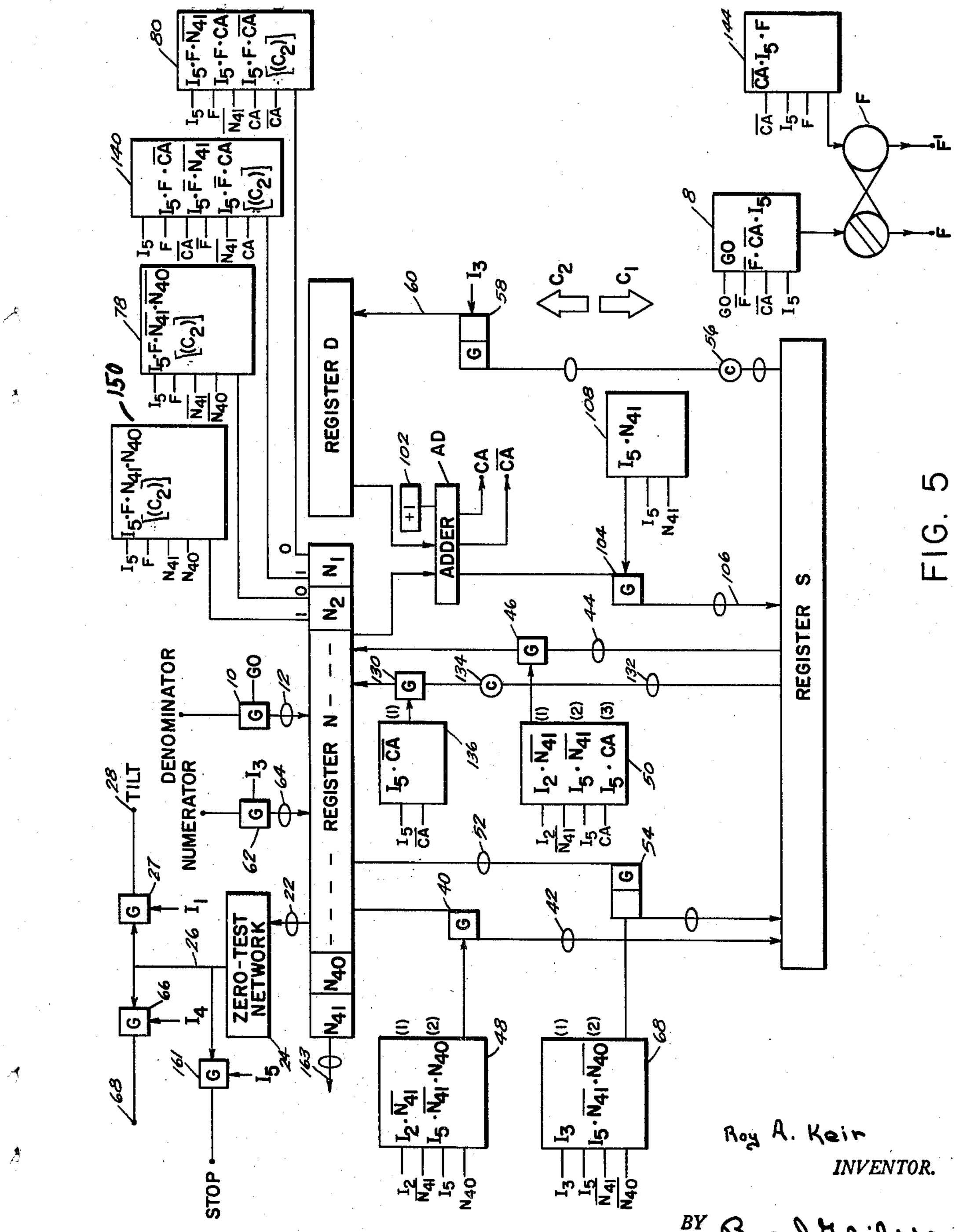
FIGURE 5 is a diagrammatic representation of another part of a system constructed in accordance with the present invention.
Figure 6:
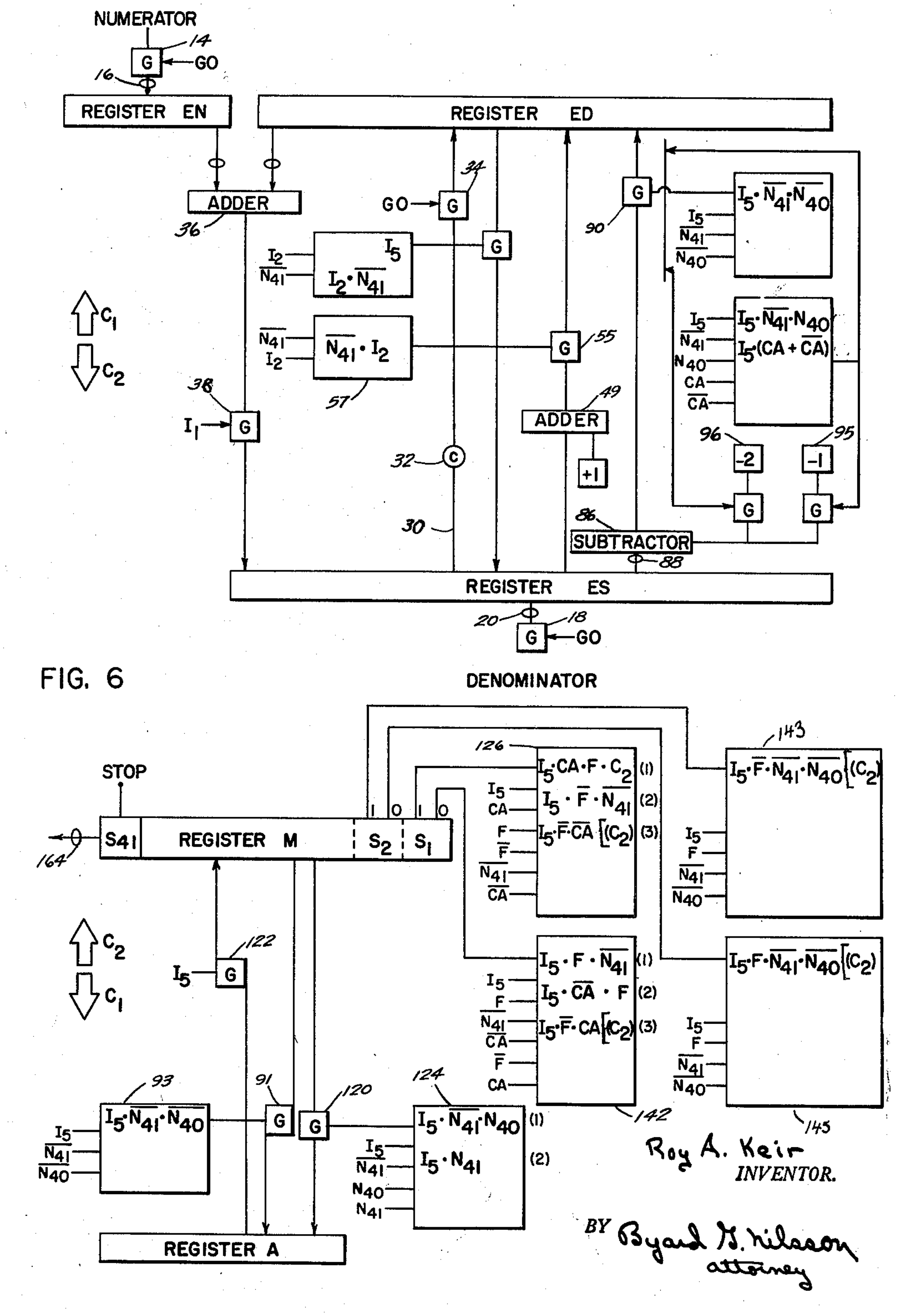
FIGURE 6 is a diagrammatic representation of still another part of a system constructed in accordance with the present invention.

In the light of the above example, the flow diagram of FIGURE 2 will now be considered in conjunction with FIGURES 4, 5 and 6 which jointly provide a diagrammatic representation of a system constructed in accordance with the present invention.

In the operation of the illustrated system, a plurality of timing signals $C_1$, $C_2$, GO, and $I_1$ through $I_5$ serve to sequence the steps. The signals $I_1$ through $I_5$ indicate irregular intervals during which certain operations are performed.

The operations performed during each of these signals are as follows:

GO: Enter mantissa and characteristic signals;
$I_1$: Zero-test denominator mantissa and subtract denominator characteristic from numerator characteristic;
$I_2$: Normalize denominator mantissa and subtract "1" from denominator characteristic for each shift of the mantissa;
$I_3$: Complement denominator mantissa;
$I_4$: Zero-test numerator mantissa;
$I_5$: Operate in first or second mode.

The signals $C_1$ and $C_2$ are regular information-transfer clock signals and occur alternately to regulate the movement of information signals. These signals along with the signals $I_1$ through $I_5$ and GO are provided from a signal generator 7 as shown in FIGURE 4, which may be variously constructed in accordance with well-known principles. The sequence of signals from the timing signal generator is initiated by a signal GO applied at terminal 8, and the signal $I_5$ is terminated by a signal STOP applied at the terminal 9.

Referring now to FIGURE 5, three registers, N, D and S are provided. These registers are interconnected by a plurality of cables, each of which includes a number of conductors for transferring parallel digitally-represented numerical values between the registers. Cables are designated by a line surrounded by a small circle and each such cable includes a group of gates (represented by a single block labeled G) which upon qualification by an input signal permits the passage of signals between the registers. These gate circuits may take the form of well-known "and" or coincidence gate circuits which upon receiving the high state of a two-state qualifying signal pass the parallel digital signals from one register to another. The two-state signals which qualify the various gate circuits are considered hereinafter; however, it is to be noted that the movement of signals from the registers N and D to the register S may occur only during a clock signal $C_1$. Conversely, signals may move from the register S to the registers D and N only during the clock signal $C_2$. The application of clock signals $C_1$ and $C_2$ is not shown to preserve the drawing legible.

In addition to being connected directly to the register S through a number of cables, the registers N and D are also connected to an adder AD which provides a parallel output to the register S. The structure of FIGURE 5 operates upon the mantissa values of the numerator and denominator.

FIGURE 6 shows registers EN, ED and ES which receive the characteristic values of the numerator and denominator and function in conjunction with interconnecting structure to develop the characteristic of the quotient. The quotient mantissa is developed in the registers M and A of FIGURE 6.

An understanding of the illustrative system of the present invention may now best be effected by considering the steps of FIGURE 2 and explaining the manner in which the structure of FIGURES 3, 4 and 5 perform these steps.

The initial operation of the system is to transfer the mantissa of the denominator into the register N (FIGURE 5) and the characteristic of the denominator into the register ES (FIGURE 6). Considering FIGURE 5 initially, a gate 10 (represented by a block containing a letter "G" and comprising a series of individual coincidence gates each connected to one conductor in a cable) is qualified by the signal GO. Upon the qualification of the gate 10, the denominator mantissa signals are transferred through a cable 12 into the register N which contains 41 stages designated $N_1$ through $N_{41}$.

The interval timed by the high state of the two-state signal GO also serves to enter the characteristic of the numerator in the register EN of FIGURE 6. These representative signals are entered through a gate 14 and a cable 16. During the same interval, the signals representing the exponent of the denominator are also entered in the register ES as a result of the qualification of a gate 18 by the signal GO to permit signals to pass through the cable 20. One further operation of the signal GO is to set the binary F (FIGURE 5) which comprises a bistable multivibrator that is considered to be set when in a state to provide the signal F high. In the reset state, the binary F provides a high state of the signal F′.

Upon the completion of the above preliminary operations, the system functions to zero-test the denominator as indicated by box "*a*" in FIGURE 2. This operation is performed during the interval of the timing signal $I_1$.

The register N (FIGURE 5) is connected through a cable 22 to a zero-test circuit 24 which may comprise a diode decoding network and provides a high signal in conductor 26 if the register N contains a zero value. The logical expression for the circuit 24 is as follows:

$$N_1'.N_2'.N_3' \ldots N_{40}'.N_{41}'$$

If the register N contains a zero, a gate 27 passes a "tilt" signal to a terminal 28 indicating that the quotient is infinite.

Also during the interval of the signal $I_1$, the characteristic of the denominator is subtracted from the characteristic of the numerator. This operation is performed by transferring the denominator characteristic from the register ES (FIGURE 6) through a cable 30, an inverter 32 and a gate 34 to the register ED. The inverter circuit 32 (as all similar circuits in the present system) is represented by a circle containing the letter "C." Inverter circuits are well-known in the prior art and serve to reverse the state of a two-state signal.

The denominator characteristic signals are next transferred from the register ED to an adder 36 along with the numerator characteristic signals from the register EN. The adder 36 is similar to the adder A of FIGURE 3 and may take the form of various well-known parallel digital adder systems. The output from the adder 36 is applied to the register ES through a gate 38 which is qualified by the signal $I_1$.

As a result of the complementation of the denominator characteristic (by the inverter 32) and the addition of the resulting signals to the signals representative of the numerator characteristic, signals representative of the difference between the numerator characteristic and the denominator characteristic are formed and stored in the register ES. This value may be considered the initial characteristic of the quotient which is altered with shifts in the mantissa values of the denominator and numerator as they are processed by the system of FIGURE 5.

Referring now to box "*b*" of FIGURE 2, it may be seen next that the next step in the operation is to normalize the denominator which is now registered in the register N of FIGURE 5. The normalizing operation consists of shifting the contents of the register N to the left until a one-digit is contained in the stage $N_{41}$. This operation is timed by the signal $I_2$ and will now be considered in detail.

The normalization of the denominator mantissa is affected by transferring signals representative of this value between the registers N and S, and incurring a one-digit shift during each transfer from the register N to the register S, until a one-digit is contained in the stage $N_{41}$. Specifically, the signals are transferred through a gate 40 and a cable 42 from the register N to the register S during the clock signal $C_1$ and are returned to the register N during the clock signal $C_2$, through a cable 44 and a gate 46.

It is to be noted, that the gate 40 is offset to the right one block width between the input cable and the output cable. This form of representation is employed herein to indicate a one-digit shift to the left in signals transferred through the gate 40 from the register N to the register S. This shift may be accomplished by staggering the stages of connection between the two registers, for example, the stage $N_1$ of the register N may be connected to the stage $N_2$ of the register S and so on, by conductors of the cable 42.

The gate circuits 40 and 46, which are qualified during this normalizing operation receive qualifying signals from networks 48 and 50. These networks may comprise various logic circuits which receive input signals that are variously combined to provide a high state of a two-state output signal when the logical equations designated in the blocks representing the networks are fulfilled. In the instant case, the network 48 provides a high signal as long as the equation $I_2.N_{41}'$ is true. Of course, this equation indicates the period of operation defined by the timing signal $I_2$ and further indicates that a zero digit occupies the stage $N_{41}$ of the register N. It is to be noted, that the various inputs to the networks disclosed are not interconnected. Interconnection of these circuits would render the drawing completely illegible; however, the source and destinations of each of the signals is shown in the figures.

As the denominator mantissa is normalized, digit shifts must be reflected in the initial characteristic. That is, shifts in the denominator mantissa to the right increase the significance of the denominator and decrease the significance of the quotient. Therefore, to compensate for these shifts, the initial quotient characteristic must be increased by one for each shift. This operation is performed by an adder 49 (FIGURE 6) connected to receive the characteristic value from the register ES through the cable 51, along the signals representing a value of "one" from a source 53. The output from the adder 49 is applied to the register ED under control of a gate 55 which is in turn controlled by a network 57 providing a high signal during the interval of shifting as defined by the expression $N_{41}'.I_2$.

When the timing signal $I_2$ goes to a low state (after an interval to provide normalization of the denominator mantissa in the register N) the timing signal $I_3$ becomes high and the system now functions to complement the denominator as indicated by box "*c*" in FIGURE 2. This operation is performed by transferring the signals representative of the mantissa of the denominator from the register N (FIGURE 5) through: cable 52, gate 54, register S, inverter 56, gate 58 and cable 60 to the register D. It is to be noted, that the gate 54 effects a shift of two-digit positions to the left in the signals while the gate 58 effects a similar shift to the right. Therefore, the net shift imparted to the signals is zero. As the signals pass through the inverter 56 they are complemented so as to provide subtractions when added to other representative digital signals. The qualification of the gates 54 and 58 is effected solely by the high state of timing signal $I_3$.

The next operation in the sequence (box "*d*," FIGURE 2) is to enter the signals representative of the numerator mantissa in the register N and test these signals for a zero value. These operations are performed during the timing intervals $I_3$ and $I_4$. During the timing interval $I_3$, a gate 62 is qualified to pass the numerator mantissa signals through a cable 64 into the register N. Thereafter, during the timing interval $I_4$, the output from the zero-test circuit 24 is applied to a gate 66 which provides a high signal at a terminal 68 if the test circuit 24 provides a high signal indicating a zero value in the register N. The appearance of a high signal at the terminal 68 therefore indicates that the numerator is zero and therefore the quotient is zero. The signal 68 is applied to the register S to clear that register and also commands STOP operations.

If the numerator is a numerical value (not zero) the system proceeds to test the most-significant digit of the numerator mantissa as indicated by box "*e*" in FIGURE 2. This operation occurs during the high state of the timing signal $I_5$, which persists throughout the remainder of the division operation.

Considering the next stage of operation and referring to boxes "*e*" and "*f*" of FIGURE 2, it may be seen that repeated shifting operations are made in the numerator mantissa value until a "one" is provided in the most-significant digit location $N_{42}$.

In accordance with the present invention, several of the most-significant digits may be simultaneously sensed and shifted in one step. For example, in the embodiment of FIGURE 5, the stages $N_{40}$ and $N_{41}$ are both sensed and if zeros occupy both stages, the contents of the register N is shifted two stages. The structure performing this operation is the cable 52 and the gate 54 under control of the network 68; and the cable 44 and the gate 46 under control of a network 50.

If the stages $N_{40}$ and $N_{41}$ register "zero" the signals $N_{41}'$ and $N_{40}'$ are high which situation is sensed by the networks 68 and 50 to qualify the gates 54 and 46 thereby transferring the contents of the register N to the register S during a clock pulse $C_1$, and transferring these signals back to the register N with a two-bit shift to the left.

In many instances, more than two of the most-significant digits in the numerator mantissa may be zero, and, of course, in accordance with the principles of the present invention, structures similar to that considered above may be provided to sense any number of stages in the register N and perform several shifts in one step.

Another situation occurs when the stage $N_1$ contains a "zero" while the stage $N_{40}$ contains a "one." In this instance, the contents of the register are shifted only one stage. This operation is performed by transferring the contents of the register N through the gate 40 and the cable 42 (incurring one shift to the left) and returning the signals through the cable 44 and the gate 46. The qualification of the gate 40 is indicated to occur during the interval of the signal $I_5$ and the high state of the signal $N_{41}'$. A similar set of signals is indicated to result in a high signal from the network 50 which qualifies the gate circuit 46.

As the contents of the register N are shifted to the left during the above operation, "zeros" are provided in the vacated stages $N_1$ and $N_2$. If both the two most-significant stages $N_{41}$ and $N_{40}$ contain "zeros," networks 78 and 80 each provide a high signal to stages $N_1$ and $N_2$ setting these stages to a zero state. If only the stage $N_{41}$ contains a "zero" only the network 80 forms a signal which sets the stage $N_1$ to zero.

During the above-described shifting operations, it is necessary to adjust the initial quotient characteristic value in the register ES (FIGURE 6). That is, for each left-shift in the numerator, contained in register N, it is necessary to subtract a "one" from the contents of the register ES. Similarly, when a shift of two digits is imparted to the numerator it is necessary to subtract "two" from the characteristic in register ES. These operations are performed by a subtractor 86 which is coupled to the register ES by a cable 88, and through a gate 90 to the register ED. The subtractor 86 receives signals indicative of values of "one" or "two" from signal sources 92 or 94 respectively, depending upon whether a gate 95 or a gate 96 is qualified. The gate 95 is qualified during intervals of a single shift in the register N which are sensed by a network 98. In a similar manner, the gate 96 is qualified during intervals of a double shift which are sensed and manifested by a network 100. Qualification of either of the gates 95 or 96 also qualifies the gate 90.

The shifting operations must also be reflected in the partial quotient mantissa as it is developed. That is, the most-significant digit of the quotient mantissa is the first to be developed. This digit is then shifted (in the registers M and A) from the least to the most-significant digit location as the remainder is shifted. The contents of the register M are shifted one position when the stage $N_{41}$ of the register N contains either a "one" or a "zero." However, two shifts are imparted when the contents of stages $N_{41}$ and $N_{40}$ are both "zeros." During the double shifts a gate 91 is qualified by a network 93 and a gate 122 is qualified by the signal $I_5$. These gates each impart one shift. During single shifts, the flow is through a gate 120 (imparting no shift) which is qualified by the network 124, and gate 122. Appropriate zero and one digits are then provided in the register M by networks 126, 142, 143 and 145.

Returning now to consider FIGURE 5, when one-digit appears in the stage $N_{41}$ of the register N, the system functions to subtract the denominator from the altered numerator, as indicated in box "*g*" of FIGURE 2. This operation is performed by the adder AD adding the complement of the normalized denominator to the altered numerator along with a one provided by a circuit 102. The output from the adder AD is applied to a gate 104 which in turn is connected to the register S by a cable 106. The gate 104 indicates a one-bit shift to the left in applying signals to the register S. Therefore, a one position shift is always incurred by the output from the adder.

The gate 104 is qualified by a signal from network 108 which senses a high state of the signals $I_5$ and $N_{41}$. In addition to providing the sum signals to the gate circuit 104, the adder AD also provides signals CA and CA'. The signal CA indicates that a "one" digit carry was propagataed into the forty second digit position, thereby indicating that the value subtracted from the altered numerator was less than the altered numerator. The signal CA' occurs when no "one" is propagated into the forty second digit position which occurs when the contents of the register D exceed the value of the contents of the register N.

Referring to FIGURE 2, the presence or absence of these signals CA' and CA may be seen to designate the path from the box "*g*." That is, if the signal CA is high, a carry was produced, and the next step of operation is designated by the box "*h*." Conversely, if no carry occurred, the signal CA' is high and the operation proceeds as indicated by the box "*i*."

Assuming initially that a carry was produced the operation is to shift the remainder left one position, inserting a "zero" and to shift the quotient left inserting a "one." The remainder resulting from the addition performed in the adder AN is shifted to the left one position in passing through the gate 104. Thereafter, during the clock pulse $C_2$, the remainder is returned to the register N through the gate 46 which is qualified by the network 50 upon the high coincidence of signals $I_5$ and CA. The insertion of a "zero" in the stage $N_1$ of the register N is effected by the network 80 which provides a signal upon the coincidence of signals $I_5$, F, and CA. The signal insertion networks are all also qualified by the timing signal $C_2$; however, this signal is only for timing purposes and is not a part of the logic of the system.

The shift left in the partial quotient under development in the registers M and A (FIGURE 6) is effected by qualification of the gates 120 and 122 by the network 124 and the signal $I_5$ respectively. A one is inserted in the least-significant digit of the quotient by a network 126 which senses the logical expression $I_5.CA.F$ at this time to set stage $S_1$ of the register M to indicate one. Thus, the operations of the box "*h*" in FIGURE 2 are performed and the operation returns to the step of box "*e*."

As indicated above, the subtraction (designated by box "*g*") may result in no carry, in which case the operation proceeds to the step indicated in box "*i*." This box commands that the system shift the remainder from the subtraction one position to the left, complementing and inserting a "one" in the vacated least-significant digit location. Also, the partial quotient is shifted left and a "zero" is inserted in the least-significant digit location. This step serves to change the operation to the second mode by complementing the remainder. Therefore, the binary F is reset to form the signal F′ in a high state.

Considering the structure for performing these operations, reference will initially be had to FIGURE 5. The remainder is shifted one bit to the left in passing from the adder AD through the gate 104 to the register F. Therefore, it is merely necessary to complement the remainder in transferring it from the register S to the register N. The complementation is performed by qualifying the gate 130, permitting the remainder to pass through the cable 132 containing an inverter 134. The gate 130 is qualified by a network 136 which senses the occurrence of the signal $I_5$ incoincidence with the signal CA′. Therefore, the remainder is shifted and complemented.

The operation of inserting a one in the least-significant digit of the remainder is performed by a network 140 which senses the occurrence of high values for signals $I_5$, F, and CA′. Thereupon the network 140 forms a signal which is applied to set the stage $N_1$ of the register N to indicate a one.

Considering the operation performed upon the partial quotient, reference will be had to FIGURE 6. The quotient is shifted one bit to the left by the qualification of gates 120 and 122 which occur as a result of a "one" being registered in the stage $N_{41}$. The insertion of a "zero" in the quotient is performed by a network 142 which senses coincidence of high values for the signals $I_5$, CA′ and F.

The flip-flop F (FIGURE 5) is reset by a signal from a network 144 which senses the signals $I_5$, F and CA′ as being in a high state. Therefore, the operations indicated are performed and the system is shifted to the second mode of operation, which fact is registered by the binary F.

The next step of operation is to test the most-significant digit of the remainder (box "*j*"). This testing operation is the first step in the cycle of the second mode of operation, which may be seen to be somewhat similar in pattern to the first mode of operation by a consideration of the chart in FIGURE 2. The testing operation is essentially built into the logic of the flow paths in the system. If the most-significant digit of the remainder is a zero, the system must function to shift the remainder and the partial quotient left one digit inserting a one in the least-significant digit position. Thereafter the operation returns to repeat the test of the new most-significant digit of the remainder. Considering FIGURE 5, and the manner in which the above operation is performed, the network 48 qualifies the gate circuit 40 if the stage $N_{41}$ contains a zero. Therefore, the contents of the register N are transferred to the register S incurring a one position shift to the left. Thereafter, the gate 46 is qualified (by the same signal) returning the remainder to the register N. In this instance, a one is inserted in the stage $N_1$ of the register N by the network 140 which senses the simultaneous high states of signals $I_5$, F′, $N_{41}'$, and $C_2$.

Of course, the two most-significant digits of the remainder may both be "zero," in which case a two position shift is incurred by passing the remainder from the register N through the gate 54 to the register S, and returning the remainder through the gate 46. In this instance, "ones" are inserted in both stages $N_1$ and $N_2$, by the networks 140 and 150 respectively.

Upon completion of the necessary shifting and inserting operations as described above to move a "one" into the stage $N_{41}$ of the register N, the system proceeds to the step indicated in box "*l*" (FIGURE 2), i.e. subtracting the denominator from the remainder. This operation is commanded by the occurrence of high values for the signals $I_5$, F′, and $N_{41}$. The occurrence of which causes the network 108 to qualify the gate circuit 104 enabling the results of the additive combination from the adder AD to be applied through the cable 106 to the register S. The next operation is then dependent upon whether or not a carry results from the addition into what would be the stage $N_{42}$ of the remainder. If a carry is produced, the signal CA is high and the operation proceeds to box "*n*" as indicated in FIGURE 2. Therefore, it is necessary to shift the remainder left, inserting a "one" and shift the quotient left inserting a "zero." The left shift of the remainder is accomplished by the gate 104. Next, the remainder is transferred back to the register N through the gate 46 which is qualified by the high value of the signals $I_5$ and CA. A "one" is inserted in the remainder by the network 140 detecting the presence of the signals $I_5$, F′, CA, and $C_2$.

The operation of shifting the quotient left and inserting a "zero" will now be considered with respect to FIGURE 5. The quotient is transferred from the register M through the gate 120 as a result of the stage $N_{41}$ registering a "one." Thereafter, the remainder is transferred back to the register M, and shifted one position or stage to the left through the gate 122. At that time a "zero" is inserted in the stage $S_1$ of the register M by the network 142 detecting the simultaneous high states of signals $I_5$, F′, and CA. These operations complete the instructions contained in box "*n*" of FIGURE 2 and the sequence therefore returns to test the most-significant digit remainder as indicated in the box "*j*."

In the event that the subtraction (indicated by box "*l*") produces no carry, the operation proceeds as designated by the box "*m*" in FIGURE 2. This stage of operation involves returning to the original mode of operation, as well as to shift the remainder left complementing and inserting a "zero" and shifting the quotient left inserting a "one." These operations are performed upon the remainder by passing the signals representative of that quantity through the gate 104 and the gate 130, which path includes the inverting circuit 134. The insertion of a "zero" is provided by the network 78 which detects the occurrence of the signals $I_5$, F′, and CA′ each in a high state.

The desired operations are performed upon the partial quotient by passing the signals representing this value from the register M through the gate 120 to the register A, and returning the same through the register 122. Furthermore, a "one" is inserted in the stage $S_1$ of the register M by the network 126 detecting high states of the signals $I_5$, F′, and CA′.

The binary F (FIGURE 5) is set by the network 8 detecting these same signals and therefore registers the fact that the system has returned to the original mode of operation. Therefore, the system continues to function according to the diagram of FIGURE 2 until the division is complete. This occurrence is manifest when the remainder becomes zero, or a "one" is shifted into the most-significant stage of the register M. Both of these situations cause a STOP signal to be produced which drives the signal $I_5$ low. The occurrence of zero in the register N (containing the remainder) is sensed by a gate 161 connected to the zero-test network 24.

Upon the termination of the signal $I_5$, the mantissa of the quotient is contained in the register M, and the register ED holds the characteristic. Of course, these values may be variously transferred, utilized or manifested in accordance with well-known prior art principles, through cables 163 and 164 respectively.

The above-described system includes many distinctly advantageous features such as high-speed operation, high accuracy, and economy of manufacture. Of course, the present invention relates to a broad system and each of these factors may vary to some degree according to the particular circuits employed to manufacture the system.

It should be noted, that although the particular embodiment of the invention described is fully capable of providing the advantages and achieving the objects set forth, this embodiment is merely illustrative and this invention is not limited to details of construction illustrated and described herein except as defined by the appended claims.

I claim:

1. A binary digital dividing system for developing a signal-represented quotient in floating-point form including a mantissa and a characteristic of signal-represented numerator and denominator values in similar form, comprising:
first register means for registering signals representative of the denominator mantissa; means for shifting the contents of said first register means whereby to normalize said denominator mantissa;
second register means for registering signals representative of the numerator mantissa; binary means initially in a first state for manifesting first and second modes of operation for said system; means for shifting the contents of said second register means into more-significant digit locations until a one appears in the most-significant digit location in said second register means;
third register means for registering the quotient mantissa as developed digit-by-digit from the most-significant digit; means operative upon each shift of the contents of said second register means to enter the next digit of the quotient mantissa in said third register means as a one during said first mode and as a zero during said second mode;
means for substracting the contents of said first regis- means from the contents of said second register means upon the occurrence of a one in the most-significant digit location of said second register means; means operative during said first mode of operation for entering the next digit of the quotient mantissa in said third register means as a one if a positive remainder results and as a zero if a negative remainder results from said subtraction; means operative during said second mode of operation for entering the next digit of the quotient mantissa as a zero if a positive remainder results and as a one if a negative remainder results from said subtraction; means for altering the state of said binary upon the occurrence of a negative remainder from said subtraction.

2. Apparatus according to claim 1 further including means to detect the occurrence of a zero value as said remainder to halt the operation of said system.

3. Apparatus according to claim 1 further including means to detect the full state of said third register to halt the operation of said system.

4. Apparatus according to claim 1 further including means to form signals representative of the characteristic values of said numerator and denominator diminished to accommodate the normalization of said denominator mantissa.

5. Apparatus according to claim 1 wherein said means for subtracting comprises means for complementing signals in said first register means representing said denominator mantissa and means for adding said complemented contents of said first register to said contents of said second register.

6. Apparatus according to claim 5 further including means to complement said remainder upon each occurrence of a negative value therefor, whereby to restore said remainder as a positive value.

7. Apparatus according to claim 1 wherein each of said register means comprise at least two registers and wherein said means for normalizing and shifting comprise means for transferring signals between said two registers to displace the signals from digit locations.

8. A floating-point binary digital dividing system, for dividing a numerator by a denominator to accomplish signals representative of a quotient, comprising:
denominator means for registering signals representative of a denominator value, including a characteristic and a mantissa;
numerator means for registering signals representative of a numerator value, including a characteristic and a mantissa;
means to normalize the mantissa portion of said denominator by shifting the contents of said denominator means registering said signals representative of a mantissa and tallying shifts therein in said denominator means registering signals representative of a characteristic;
binary means for manifesting first and second modes of operation for said dividing system;
means for setting said binary means to manifest a first mode at the outset of operation;
means for shifting digital signals in said numerator means to accomplish a signal representative of a binary "one" signal in the most significant digit location thereof;
subtraction means for subtracting signals in said denominator means representing said mantissa from signals in said numerator means representing said mantissa upon occurrence of a binary "one" signal in the most significant digit location in said numerator means;
quotient means for registering a quotient digit of said quotient upon each shift in said numerator means, such quotient digit being determined by the mode manifest by said binary means, and for registering a quotient digit of said quotient upon each operation of said subtraction means, such quotient digit being determined by the mode manifest by said binary means and by the sign of the result of said subtraction; and
means for altering said binary means upon occurrence of a negative result from said subtraction.

9. A floating-point binary digital dividing system, for dividing a numerator by a denominator to accomplish signals representative of a quotient, comprising:
denominator means for registering signals representative of a denominator value, including a characteristic and a mantissa;
numerator means for registering signals representative of a numerator value, including a characteristic and a mantissa;
means to normalize the mantissa portion of said denominator by shifting the contents of said denominator means registering said signals representative of a mantissa and tallying shifts therein in said denominator means registering signals representative of a characteristic;
binary means for manifesting first and second modes of operation for said dividing system;
means for setting said binary means to manifest a first mode at the outset of operation;
means for shifting digital signals in said numerator means to accomplish a signal representative of a binary "one" signal in the most significant digit location thereof;
parallel subtraction means for simultaneously receiving signals from said denominator means representing said mantissa and receiving signals from said numerator means representing said mantissa for producing signals representing a result in the form of signals representing the value manifest by said signals received from said denominator means subtracted from the value manifest by said signals received from said numerator means;
quotient means for registering a quotient digit of said quotient upon each shift in said numerator means, such quotient digit being determined by the mode manifest by said binary means, and for registering a quotient digit of said quotient upon each operation of said subtraction means, such quotient digit being determined by the mode manifest by said binary means and by the sign of the result of said subtraction; and means for altering said binary means upon occurrence of a negative result from said subtraction.

References Cited by the Examiner

UNITED STATES PATENTS 3,033,457 5/62 Strachey -------------- 235—165

FOREIGN PATENTS 802,656 10/58 Great Britain.

OTHER REFERENCES

Pages 209–10, October 1957, Report No. 80 on the design of 9, Very High-Speed Computer, University of Illinois Graduate College Digital.

MALCOLM A. MORRISON, *Primary Examiner.*

CORNELIUS D. ANGEL, *Examiner.*